Jan. 26, 1954
R. W. ANDREASSON
2,667,357
TOOLHOLDER
Filed Sept. 5, 1952
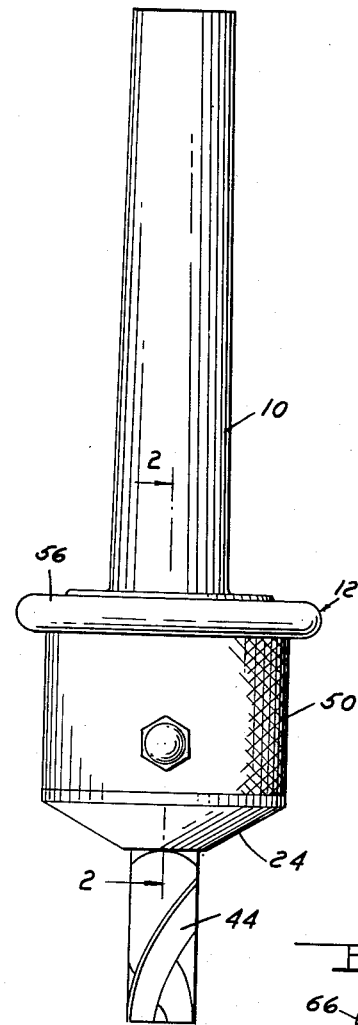
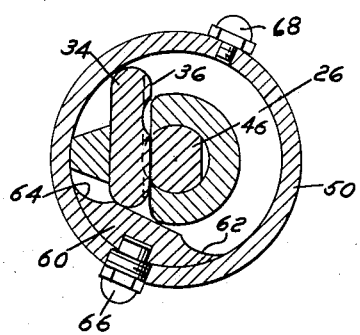
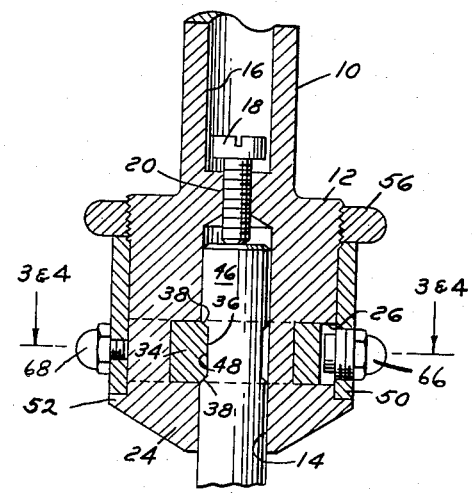
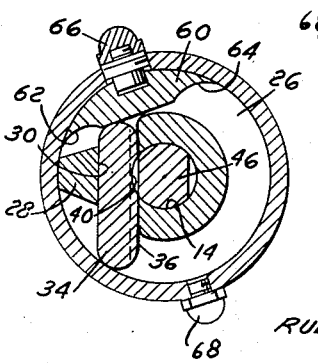
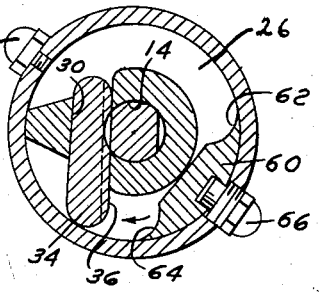
INVENTOR.
RUDOLF W. ANDREASSON
BY
Barnes, Kisselle, Laughlin & Raisch
ATTORNEYS Patented Jan. 26, 1954

2,667,357

UNITED STATES PATENT OFFICE 2,667,357

TOOLHOLDER

Rudolf W. Andreasson, Detroit, Mich.

Application September 5, 1952, Serial No. 307,963

14 Claims. (Cl. 279—81)

This invention relates to a tool holder and is intended to be used to hold drills, reamers, end mills, counterbores and other combination tools.

Numerous tool holders exist today which require special contours or configurations on tool shanks, and bayonet slot devices and other special designs are used, any of which require very accurate machining in order that the tool may be held properly.

It is an object of the present invention to provide a tool holder which may be utilized on tool shanks having a simple flat mill thereon, the dimensions of which do not require close tolerances.

It is a further object to provide a tool holder which will accurately and securely grip the tool to prevent end motion while accurately centering the tool.

Another object of the invention is the provision of a tool holder which can be operated without the need of a wrench, thus making it possible for an operator to change tools without searching around for a separate instrument to loosen or tighten a chuck or set screw.

A further object of the invention is the provision of a tool holder which can be used for any size tools and which may be used either for right-hand or left-hand operation.

Other objects and features of the invention relating to details of construction and operation will be apparent in the following description and claims.

Drawings accompany the specification, and the various views thereof may be briefly described as:

Figure 1, an elevation view of a tool holder and tool in place.

Figure 2, a vertical section on line 2—2 of Figure 1.

Figure 3, a transverse section on line 3—3 of Figure 2 showing the parts in locked position.

Figure 4, a section on line 4—4 of Figure 2, showing the parts about to be unlocked.

Figure 5, a view similar to Figure 4 showing the parts in released position.

Figure 6, a view showing the actuator approaching a hammer position to move the parts to locked position.

Referring to the drawings, in Figure 1 the tool will be seen to consist of a shaft 10 and an enlarged head portion 12. The shaft 10 may be provided with a Morse taper as is customary on this type of shank.

As shown in Figure 2, the head portion has a central bore 14 and the shank portion 10 is also provided with a bore 16 to permit the control of a backing screw 18 threaded into the bore 14 through the wall 20.

The head portion 12 is provided with a tapered end 24, and spaced upwardly from this end the head portion is milled away in an annular groove 26 which extends completely around the head except for a wall portion 28 which remains to connect the upper and lower portions of the head.

A passage 30 extends transversely through the head 12 intersecting at each end the groove 26 and intersecting the central bore 14 as it passes to one side thereof. This passage 30 is provided for a tapered wedge 34 which preferably has one side 36 disposed at an angle of 3 degrees to the central plane of the wedge.

The corners of the wedge on this same side 36 are beveled at 45 degrees as shown at 38 to facilitate end locking of a tool, as will be later described. The side 36 of wedge 34 is also cut away at 40 to allow passage of a tool shank in and out of a holder when the wedge is in the position shown in Figure 5.

The tool which, for example, consists of an end mill 44 has a shank 46 (Figure 2) provided with a flat 48. This flat has beveled ends to cooperate with the beveled surfaces 38 on wedge 34.

A locking and releasing means is provided for the wedge 34 in a rotating collar 50 surrounding the head portion 12. This collar is held against axial movement by a shoulder 52 on head 12 and a threaded locking ring 56 on the top of head 12 which serves to lock the ring 50 against rotation when desired.

Mounted on the inner surface of collar 50 is a hammer member 60 positioned to revolve in the groove 26 of head 12. This hammer member 60 has thin wedge portions 62 and 64 at each end, and the hammer itself is held in position on the inner surface of collar 50 by a set screw 66. A screw 68 diametrically opposed helps in the turning of collar 50.

In the operation of the device, when the parts are in the released position shown in Figure 5, it is possible to slip the shank 46 of a tool into the bore 14, the opening 40 on wedge 34 permitting the top of the shank 46 to enter against the backing screw 18. The backing screw 18 is provided simply to position the shank 46 initially for engagement with wedge 34.

When the parts are thus positioned, in a right-hand drive unit, the hammer 60 shown at the top of Figure 5 is rotated in the direction of the arrow shown in Figure 6 until the wedge portion 64 scoops under the end of the wedge 34 to push it to locking position shown in Figure 3.

By backing off the hammer 60 and rotating it sharply against the end of the wedge as shown in Figure 3, the wedge is forced into position to lock the shank 46 against any possibility of displacement. With the collar 50 in the position shown in Figure 3 the locking ring 56 may then be screwed down to lock all of the parts against displacement.

When it is desired to remove the tool 44, the locking ring 56 is readily released; and the collar 50 may be rotated to the position shown in Figure 4, where it will force the wedge to a position shown again in Figure 5, wherein the shank 46 may be removed.

It will thus be seen that I have disclosed a tool holder which can be actuated from locking position to released position with no additional tools required. By the use of a simple flat on a tool shank a tool may be positively held to an accuracy of less than .0005 inch.

The backing screw 18 need not be accurately positioned except to within $\frac{1}{32}$ of an inch, and this is not a load-bearing member. The tapered wedge 34 with the beveled sides locates the tool against endwise motion while locking it also against rotation in the holder. Therefore, if it is necessary to grind $50/_{1,000}$ off the end of a tool, the location is so positive that when it is replaced it may be advanced that amount in the machine and the cut will be the same as it was before.

It will be seen from the drawings that the wedge 34 is dimensioned endwise so that it just barely clears the sleeve 50 in its locked position (see Figure 3). Thus, the wedge has all the length that is possible within the confines of the sleeve.

Also, in view of the fact that the hammer member 60 is not rigidly attached to the sleeve but has a floating relationship in the groove 26, the wedge portions 62 and 64 are enabled to project between the sleeve 50 and the end of the wedge to cam it from one extreme position to another.

It will be seen also that the device may be used for either right- and/or left-hand locking. By reversing the wedge 34 in passage 30, the locking action is reversed; and counter-clockwise rotation of sleeve 50 will then cause the wedge to move to a hold position.

It will be apparent that the device is adaptable to all sizes of tools and that any tool may be adapted for use with this tool holder by simply grinding a flat on one surface thereof with 45 degrees beveled ends.

I claim:

1. A chuck for holding tool shanks comprising a head portion having an axial bore to receive a tool shank and a chordal passage intersecting said bore, a wedge receivable within the confines of said head portion slidable in said passage, and means movable on said head positioned to strike said wedge selectively from either end to shift it to a holding position against a tool shank and to a release position.

2. A device as defined in claim 1 in which the striking means comprises a sleeve rotatable on said head and an inward projection on said sleeve shaped to engage said wedge.

3. A device as defined in claim 1 in which the striking means comprises a sleeve rotatable on said head and confined against axial displacement, and means associated with said head and said sleeve movable in an orbed path to engage either end of said wedge depending on the direction of rotation of said sleeve.

4. A device as defined in claim 1 in which means is selectively associated with said sleeve and said striking means to block movement of said wedge to a release position.

5. A chuck for holding tool shanks comprising a head portion having an axial bore to receive a tool shank and a chordal passage intersecting said bore, a wedge receivable within the confines of said head portion slidable in said passage to present a surface moving toward or away from said bore, a striker block shiftable in an orbed path around said head portion to either end of said passage to strike said wedge selectively from either end, and movable means associated with said striker block to confine the block in its path and permit manual shifting of the block from the outside of the head.

6. A device as defined in claim 5 in which means is selectively engageable with said movable means to lock said striker block in position to block motion of said wedge.

7. A device as defined in claim 5 in which said striker block is provided with wedge-cam surfaces at either end to initiate movement of said wedge and with adjoining surfaces at each end to hammer the wedge.

8. A device as defined in claim 7 in which the striker block has a floating relation to said movable means to allow relative radially displacement.

9. In combination a chuck and a tool shank to be locked together for a work cutting relation in which the tool shank is circular in cross-section and is provided with a surface groove extending transversely of the axis, and the chuck comprises a head portion having a circular axial bore to receive the tool shank and a chordal passage intersecting said bore, a wedge receivable within the confines of said head portion slidable in said passage having a surface to engage the sides of said groove and shaped to present a surface movable toward or away from said bore in response to endwise movement of the wedge, and means movable on said head positioned to strike said wedge selectively from either end to shift it to a holding position in the groove of said tool shank and to a release position, said wedge being relieved at one end to allow withdrawal of said tool shank while said wedge remains in said passage in release position.

10. A combination as defined in claim 9 in which movable means comprises a ring freely rotatable on said head portion and co-axial therewith and a striker member within said ring positioned to strike said wedge at each end selectively to move it from and to its respective positions.

11. A combination as in claim 10 in which the striker member is loosely confined between said ring and said head portion, and a pin on said ring penetrating into a recess in said member to locate the member relative to the ring.

12. A combination as in claim 11 in which a relatively large head is mounted on the end of said pin outside said ring, and a similar head is located on said ring in spaced relation to add to the inertia force of said ring and striker when moved suddenly against said wedge.

13. A chuck for holding tool shanks comprising a head portion having an axial bore to receive a tool shank and a chordal passage intersecting said bore, a sleeve rotatably mounted around said head, a wedge receivable within the confines of said head portion and said sleeve slidable in said passage to lock and release positions with its ends selectively closely adjacent the inner wall of said ring, an actuator block within and movably associated with said ring and movable in an orbital path around said head, said wedge and said block having co-operating inclined surfaces at their respective ends engageable to initiate movement of said wedge to each of its respective positions, a portion of said block spaced from the inclined surfaces thereon serving to hammer said wedge to its respective positions.

14. A device as defined in claim 13 in which the bore is circular to receive a notched circular tool shank and one end of said wedge is relieved to allow withdrawal of said tool shank while said wedge remains in said passage in release position.

RUDOLF W. ANDREASSON.

References Cited in the file of this patent

UNITED STATES PATENTS

| Number | Name | Date |
| --- | --- | --- |
| 646,489 | Cook | Apr. 3, 1900 |
| 688,860 | Kay et al. | Dec. 17, 1901 |